Nov. 7, 1944.   L. L. TIRRELL   2,361,981
METHOD AND MEANS FOR DEFROSTING AIR
Filed Sept. 15, 1941
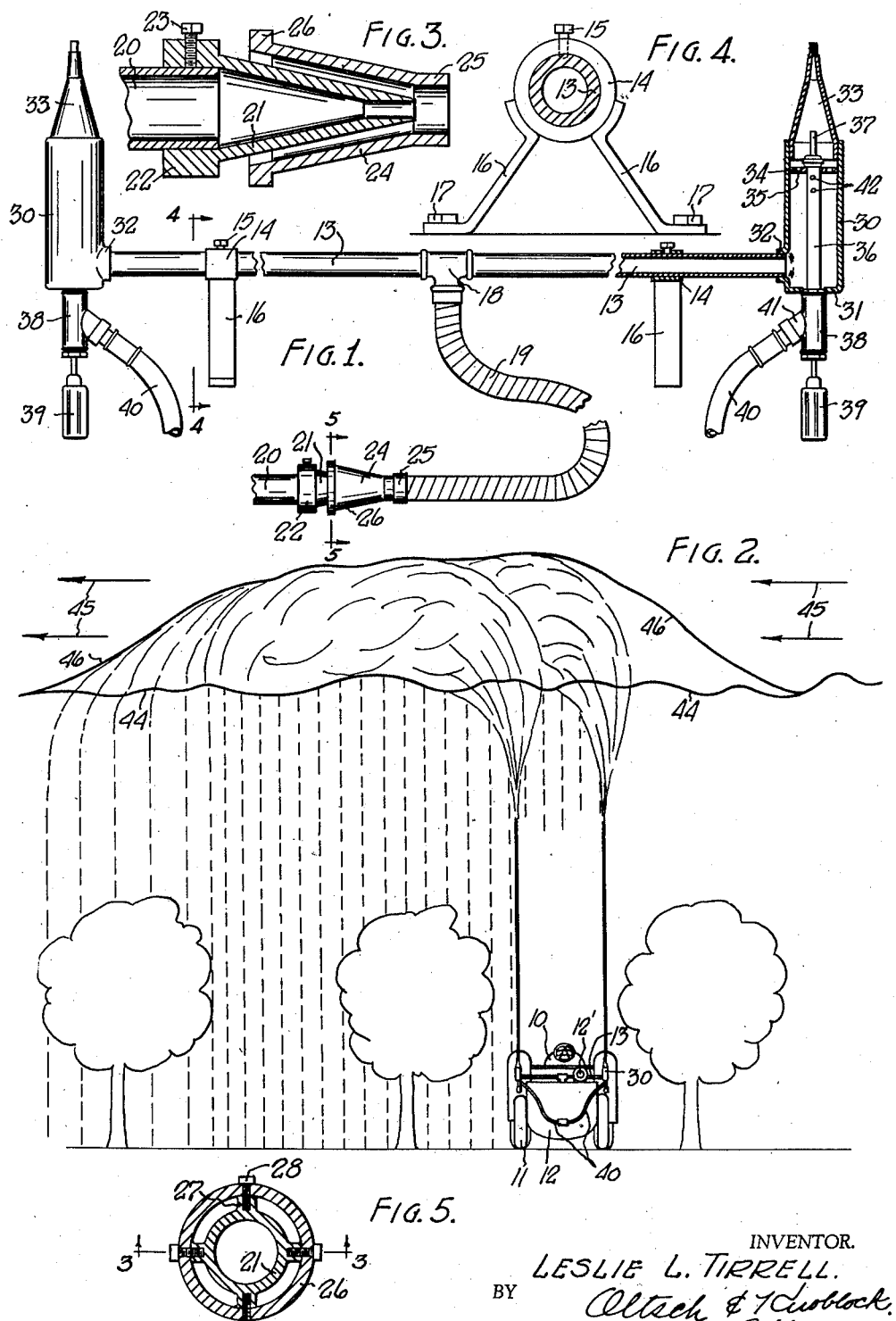
INVENTOR.
LESLIE L. TIRRELL.

Patented Nov. 7, 1944

2,361,981

UNITED STATES PATENT OFFICE 2,361,981

METHOD AND MEANS FOR DEFROSTING AIR

Leslie L. Tirrell, Benton Harbor, Mich.

Application September 15, 1941, Serial No. 410,904

11 Claims. (Cl. 47—2)

This invention relates to a method and means for defrosting air, and particularly to a method and means by which horticulturists may prevent the frost damage to orchards and vineyards which results from the unseasonal occurrence of frost conditions during the growing season.

Horticulturists, and particularly the growers of fruits and berries, frequently suffer severe economic losses from frost during the growing season. Various methods have been devised and practiced to combat frost, but each of these has had certain limitations which have rendered it practical only under specific conditions. The use of smudge pots is one method devised to combat frost damage, but is objectionable because of the large number of units required for a given area, the large fuel consumption thereof, the small effective temperature increase over a given area which can be produced thereby, and the comparative low height to which they are effective.

I have discovered that it is possible to successfully combat frost conditions over a large area, such as an orchard or a vineyard, by the use of mobile spraying equipment traveling at slow speed and operating at a high pressure to project a large volume spray of heated water upwardly a distance of 50 or 60 feet and into the zone of moving air above the static frost zone.

The projection of the spray into the moving air zone causes it to drift with the air mass and to precipitate over a large area in which the temperature in the static frost zone is raised by the transfer of heat from the spray to the air. This heat transfer raises the temperature above the danger point in the zone of the static air subject to frost, and raises the frost line or level above the trees, plants, or vines, to prevent the frost from lowering into contact therewith.

More particularly, I find that by mounting spraying equipment adapted to operate at high pressures on a mobile unit, such as a tractor, and by connecting the spraying equipment with the exhaust manifold of the engine of the tractor in a manner to mix air with the hot products of combustion of the engine and introduce the mixture into the spraying equipment, it is possible for one man operating one unit to cover a large area, such as an orchard, raise the temperature of the air around the trees, plants, or vines in that area by from 1 to 7 degrees Fahrenheit, to successfully combat the largest proportion of frost conditions which occur during the growing season.

My invention particularly contemplates the spraying of a mixture of heated air and water to take advantage of the superior heat conducting properties and the superior affinity for water possessed by heated air as compared to the gaseous products of combustion, such as carbon dioxide, and carbon monoxide.

My invention also contemplates the utilization of the properties of a spray under high pressure to create an air current in the direction of the spray, whereby it is possible, when the spray is upwardly directed, to create an upward current or movement of static cold air which greatly assists in combating a frost condition.

My invention also includes novel means for entraining and heating air in a flow or stream of carbon dioxide or other gaseous products of combustion, and for introducing the mixture of heated air and carbon dioxide into a spraying device connected with a source of liquid and operating at high pressures.

More particularly, my invention may be practiced by mounting upon a mobile high pressure spraying unit, a fixed upwardly directed spray nozzle having a conduit connection with said spraying unit and a conduit connection with the exhaust manifold of the internal combustion engine of the tractor, said last named conduit being provided with an air intake.

Other objects and advantages of the invention will be apparent from the description, drawing, and appended claims:

In the drawing:

Fig. 1 is a side view of my device with parts broken away and with parts shown in section.

Fig. 2 is a diagrammatic view illustrating the manner in which my improved method operates to combat frost conditions.

Fig. 3 is a longitudinal detail sectional view taken on line 3—3 of Fig. 5.

Fig. 4 is a transverse sectional view taken on line 4—4 of Fig. 1.

Fig. 5 is a transverse sectional view taken on line 5—5 of Fig. 1.

Referring to the drawing, which illustrates the preferred embodiment of the invention, the numeral 10 designates a mobile unit such as a tractor, which is adapted to draw a spray unit mounted upon wheels 11 and including a liquid supply tank 12, a suitable pump 12' which subjects the liquid within the container 12 to high pressure, for example, a pressure in the range of from 300 to 700 pounds per square inch, and preferably around 600 pounds. Mobile spray units of the type above described are now commonly employed by fruit growers for the purpose of spraying trees to control insect pests, to forcibly remove loose bark from the trunks and limbs of the trees, and for other purposes.

I propose to mount upon the mobile unit 10—12 above described, a device as illustrated in Fig. 1. This device preferably comprises an elongated pipe 13 carried by suitable brackets mounted on the mobile unit 10—12 and best illustrated in Fig. 4. These brackets may comprise a ring 14 encircling the pipe 13 and provided with a set screw 15 by means of which the pipe may be locked in fixed relation in the ring. Ring 14 is mounted upon suitable downwardly diverging leg portions 16 which are adapted to be fixedly secured to a supporting member, such as the frame of the mobile unit, by bolts 17. The brackets 16 mount opposite ends of the pipe 13 in a transverse position relative to the mobile unit. The pipe 13 is preferably of a length of approximately 6 feet, or the average width of a tractor. As shown, pipe 13 is divided in two sections which are connected together by the T-fitting 18. A flexible conduit 19 is connected with the T-fitting 18 and extends adjacent the discharge end of the exhaust manifold 20 of tractor 10. Upon the end of the exhaust manifold 20 is mounted a frusto-conical discharge jet 21 having a collar portion 22 fitting around the end of the exhaust manifold 20 and secured thereto, as by set screws 23. On the end of the conduit 19 is mounted a frusto-conical fitting 24. The small diameter end of the fitting 24 is connected with the conduit 19 by means of a collar 25. The large diameter end of the fitting 24 terminates in a collar 26. Frusto-conical jet 21 is provided intermediate its ends with a plurality of spaced radial ribs 27 which fit tightly within the collar 26 of the fitting 24, and set screws 28 extend through the collar 26 and into the ribs 27 for the purpose of fixedly securing the fitting 24 to the jet 21.

As best illustrated in Fig. 3, the jet 21 extends into the fitting 24 in concentric relation thereto with its outer periphery spaced from the inner periphery of the fitting 24. Hence, it will be observed that, as the products of combustion, such as carbon dioxide, are discharged from the exhaust manifold 20 through the tapered and restricted Venturi opening of the jet 21, their velocity is increased and a suction effect is created within the fitting 24 which draws air into said fitting around the jet 21 to entrain the same with the products of combustion. A mixture of air and the hot gaseous products of combustion is thus created, and this mixture passes through the conduit 19 and into and through the opposite branches or ends of the elongated pipe 13. During the travel of the gas-air mixture through this pipe and conduit the air is heated by the products of combustion which are discharged from the exhaust manifold at a temperature substantially above the boiling point of water. Hence, the mixture of air and water reaches the opposite ends of the pipe 13 at a high temperature which is capable of heating to a considerable degree the water with which it comes in contact and with which it is mixed.

A spraying nozzle is mounted upon each end of the pipe 13. As best illustrated in Fig. 1, these spraying nozzles each comprise a vertically positioned tubular housing 30 having an inturned annular flange 31 at its inner end and a laterally projecting collar 32 at one side thereof adjacent its lower end and preferably internally screw threaded for mounting thereof upon the end of the pipe 13.

A conical end member 33, having a small or minute end opening, is mounted upon the upper open end of each housing 30. Within the housing 30 and below the member 33 is mounted a transverse plate 34 having a plurality of spaced apertures 35 therein, and large central aperture adapted to receive the tubular end portion of a spray gun 36 which terminates above the plate 34 in a reduced diameter neck outlet portion 37. The nozzle 36 projects upwardly through the apertured bottom 31 to extend into housing 30 as aforesaid, and includes a valve housing 38 and a suitable valve operating handle 39. A conduit 40 is connected with the container 12 of the mobile unit and with a branch conduit 41, projecting from the valve housing 38 of the spray nozzle. The tubular portion 36 of the spray gun may be provided with apertures 42 therein below the cross plate 34 of the housing 30 for introduction of air into the nozzle.

Referring now to Fig. 2, wherein the use of the device is illustrated diagrammatically, the lowering frost line preceding a frosting weather condition is illustrated at 44. The zone below the frost line 44 is a static zone, while air currents are moving in the zone above the line 44, as indicated by the arrows 45. As the lowering of the frost line and of the temperature at ground level is observed to approach a dangerous condition, the spraying unit as above described may be used. The manner of use of the spraying unit is to run the unit 10—12 in a direction transverse of the wind direction beginning at the upwind end of the orchard, or vineyard, to produce and discharge two or more upwardly directed sprays of heated water. When the mobile unit is provided with a compressor which will generate a water pressure of from 300 to 700 pounds per square inch, the spray will be projected into the air a distance of 40 to 60 feet. Thus, if frost line 44 has dropped below 40 feet elevation before the operation is started, the spray passes through the static frost zone into the zone of moving air. The moving air propels or carries the spray therewith to be dispersed and precipitated over a large area in a downwind direction.

It will be observed that the force and velocity of the spray in an upward direction passing through the static air zone create an upward current of air within the static zone. In this connection, the frosts which occur during the growing season are usually accompanied by a static air condition at ground level, and entail a temperature drop of a few degrees below freezing. The air is usually moving at an elevation of 30 to 60 feet above ground level. A temperature drop of a few degrees below the freezing point, accompanied by movement of air at ground level, does not ordinarily endanger plants and trees. Hence, the importance of the stirring of the static air by the spray during an impending frosting condition will be evident.

As the heated spray precipitates through the area below the frost line 44, a heat transfer occurs between the heated spray and the air. Assuming that the quantity of the spray projected by the device is in the order of 10 to 20 gallons of water per minute, and that the mobile unit travels at a speed of from 4 to 10 miles per hour, the precipitating spray will be effective to measurably increase the temperature of the air and to elevate the frost line to the level shown at 46. The condition created is one which will normally be effective for three or four hours. The frost condition usually lasts for only a few hours, so only one trip through the area to be protected is usually required, but the operation may be repeated in the event the frost condition continues for more than three or four hours.

The embodiment of the invention found to be most practical is one wherein the mobile operating unit 10—12 is equipped with a pump 12' for subjecting the water within tank 12 to from 500 to 600 pounds pressure. This high pressure causes a high velocity spray discharge from the gun 36 to reach the elevations above mentioned. Of equal importance is the air intake structure 21—24 by which a high velocity discharge of carbon dioxide and carbon monoxide from nozzle 21 draws air from atmosphere through the conical fitting 24 into which the nozzle unit 21 projects. The air thus drawn into the fixture 24 is entrained and mixed with the products of combustion to pass therewith through conduit 19 and pipe 13. The suction effect of the spray nozzles 36 within the housings 30 further facilitates the introduction of air into the system and assures rapid movement of the heated gas-air mixture to the casings 30 to minimize loss of heat thereby. Part of the gas-air mixture passes through the openings 42 in the spray nozzle to assist in atomization of the water passing therethrough, and the remainder thereof passes through the openings 35 in the plate 34 to be mixed with the spray immediately after the same is discharged from the end 37 of the spray nozzle.

With a unit generating a pressure of from 500 to 600 pounds per square inch, it is possible to spray 20 gallons of water per minute. The spraying of this quantity of water makes possible the increase of the temperature in a frost danger zone by as much as 5 to 8 degrees Fahrenheit while the mobile unit is traveling at a speed of from 4 to 10 miles per hour. This temperature increase is more than ample to meet and successfully combat the usual frost conditions which may occur during the growing season.

Attention is particularly directed to the fact that the introduction of air into the device and the heating of that air by the stream of the gaseous products of combustion, is of marked importance in this device. It is well known that heated air has a greater affinity for water than do heated gases, such as carbon dioxide. Hence, the best conditions for transfer of heat from the exhaust manifold to the liquid to be sprayed are provided in the device. Additionally, it will be observed that the heating of the liquid spray provides superior heat transfer properties as compared to mere heated gas or air. In this connection note that a spray of this character has a tendency, when finely divided or atomized, to hang in the air, so that heat transfer is facilitated.

I claim:

1. The method of combating an impending frost condition, comprising the steps of entraining and mixing atmospheric air in a stream of heated gas, entraining and mixing said heated gas and air mixture in a stream of water at a discharge point spaced from the point at which air is entrained, to heat and atomize the water, and discharging the water upwardly in the form of a finely divided spray at a pressure sufficient to project said spray to a height of at least forty feet.

2. The method of combating an impending frost condition, comprising the steps of subjecting a liquid to a pressure of from 300 to 700 pounds per square inch, collecting heated gaseous products of combustion and mixing free air therewith, entraining the heated gas and air mixture in a stream of the liquid at a discharge point to heat and atomize the liquid, and discharging the heated liquid vertically upwardly into the atmosphere in the form of a finely divided spray.

3. The method of combating an impending frost condition, comprising the steps of entraining and mixing air with the gaseous products of combustion of a heat generating means, subjecting a supply of water to a pressure in the order of 500 to 600 pounds per square inch, entraining and mixing said gas-air mixture with the water at a discharge point, discharging the water upwardly in the form of a spray, and moving the point of spray discharge in a cross wind direction beginning at the up-wind side of the area to be protected.

4. The method of combating an impending frost condition, comprising the steps of introducing heated air into a stream of water at a discharge point and under a pressure in the order of 500 to 600 pounds, discharging the heated water upwardly in the form of a spray at a rate in the order of 15 to 20 gallons per minute, and moving the point of spray discharge through the area to be protected at a speed in the order of five miles per hour.

5. In an apparatus for combating an impending frost condition, the combination with a mobile unit including a tractor having an internal combustion engine and an exhaust manifold, a liquid storage tank, and means for subjecting liquid in said tank to high pressure, of an upwardly directed spray nozzle mounted on said unit, a conduit connecting said nozzle with said tank, and conduit connecting said nozzle with said exhaust manifold, said last named portion having an opening therein and including a Venturi portion juxtaposed to said opening.

6. In an apparatus for combating an impending frost condition, the combination with a mobile unit including a tractor having an internal combustion engine and an exhaust manifold, a liquid storage tank, and means for subjecting liquid in said tank to high pressure, of an upwardly directed spray nozzle fixedly mounted on said unit and connected with said tank, a conduit connecting said nozzle with said manifold, and means in said conduit for introducing air therein.

7. In an apparatus for combating an impending frost condition, the combination with a mobile unit including a tractor having an internal combustion engine and an exhaust manifold, a liquid storage tank, and means for subjecting liquid in said tank to high pressure, of a chamber fixedly mounted on said unit and having an upwardly directed tapering outlet, an upwardly directed spray gun projecting into said chamber and having restricted apertures therein spaced from its discharge end, an apertured plate spanning said chamber between the discharge end and the apertures of said spray gun, and a conduit connecting the lower end of said chamber with said manifold.

8. In an apparatus for combating an impending frost condition, the combination with a mobile unit including a tractor having an internal combustion engine and an exhaust manifold, a liquid storage tank, and means for subjecting liquid in said tank to high pressure, of a chamber fixedly mounted on said unit and having an upwardly directed tapering outlet, an upwardly directed spray gun projecting into said chamber and having restricted apertures therein spaced from its discharge end, an apertured plate spanning said chamber between the discharge end and the apertures of said spray gun, and a conduit connecting the lower end of said chamber with said manifold, said conduit having an opening therein and a Venturi portion juxtaposed to said opening.

9. In an apparatus for combating an impending frost condition, the combination with a mobile unit including a tractor having an internal combustion engine and an exhaust manifold, a liquid storage tank, and means for subjecting liquid in said tank to high pressure, of a chamber fixedly mounted on said unit and having an upwardly directed tapering outlet, an upwardly directed spray gun projecting into said chamber and having restricted apertures therein spaced from its discharge end, an apertured plate spanning said chamber between the discharge end and the apertures of said spray gun, a conduit connected with the lower end of said chamber, frusto conical fitting having its small diameter end mounted on the end of said conduit opposite said chamber, a tapered nozzle mounted on said manifold and having a restricted discharge opening, said nozzle extending into said fitting in spaced relation to the walls thereof, and means for securing said fitting to said nozzle.

10. An apparatus for combating an impending frost condition, comprising a wheeled vehicle, a liquid tank carried by said vehicle, a compressor connected with said tank, heat generating means on said vehicle having an outlet for gaseous products of combustion, an upwardly directed spray nozzle fixed on said vehicle, a conduit connecting said nozzle and tank, and a conduit connecting said nozzle and outlet, said last conduit having an air intake opening therein adjacent said heat generating means.

11. An apparatus for combating an impending frost condition, comprising a wheeled vehicle, a liquid tank carried by said vehicle, a compressor connected with said tank, heat generating means on said vehicle having an outlet for gaseous products of combustion, a chamber fixed on said nozzle and having a tapering outlet at its upper end, a spray gun connected with said tank, and projecting into said chamber in alignment with the chamber outlet, said gun having restricted openings in the portion thereof within said chamber, and a conduit connecting said chamber and the outlet of said heat generating means, said conduit having an air intake opening therein adjacent said heat generating means.

LESLIE L. TIRRELL.